United States Patent
Gerhardt et al.

(10) Patent No.: US 9,982,096 B2
(45) Date of Patent: May 29, 2018

(54) FLAME RETARDANT PRECURSORS, POLYMERS PREPARED FROM SUCH PRECURSORS, AND FLAME RESISTANT FABRICS TREATED WITH SUCH POLYMERS

(71) Applicant: MILLIKEN & COMPANY, Spartanburg, SC (US)

(72) Inventors: Warren W. Gerhardt, Greer, SC (US); Jason M. Spruell, Spartanburg, SC (US); Petr Valenta, Greer, SC (US); Rajib Mondal, Greer, SC (US); Daniel T. McBride, Chesnee, SC (US); Keith A. Keller, Spartanburg, SC (US)

(73) Assignee: Milliken & Company, Spartanburg, SC (US)

( * ) Notice: Subject to any disclaimer, the term of this patent is extended or adjusted under 35 U.S.C. 154(b) by 578 days.

(21) Appl. No.: 14/520,660

(22) Filed: Oct. 22, 2014

(65) Prior Publication Data

US 2015/0118931 A1   Apr. 30, 2015

Related U.S. Application Data

(60) Provisional application No. 61/895,718, filed on Oct. 25, 2013.

(51) Int. Cl.
| | | |
|---|---|---|
| *C08G 79/04* | (2006.01) | |
| *D06M 15/673* | (2006.01) | |
| *C09K 21/12* | (2006.01) | |
| *C09K 21/14* | (2006.01) | |
| *D06M 15/431* | (2006.01) | |
| *D06M 101/06* | (2006.01) | |

(52) U.S. Cl.
CPC .............. *C08G 79/04* (2013.01); *C09K 21/12* (2013.01); *C09K 21/14* (2013.01); *D06M 15/431* (2013.01); *D06M 15/673* (2013.01); *D06M 2101/06* (2013.01); *D06M 2200/30* (2013.01); *Y10T 442/268* (2015.04)

(58) Field of Classification Search
USPC ................ 442/268, 142–143; 427/341–342; 428/920–921
See application file for complete search history.

(56) References Cited

U.S. PATENT DOCUMENTS

| | | | |
|---|---|---|---|
| 2,809,941 A | 10/1957 | Reeves et al. | |
| 2,983,623 A | 5/1961 | Coates | |
| 4,046,701 A * | 9/1977 | Smith | .................... D06M 13/21 |
| 4,053,518 A | 10/1977 | Weston et al. | |
| 4,068,026 A | 1/1978 | Wagner | |
| 4,078,101 A | 3/1978 | Cole | |
| 4,095,945 A | 6/1978 | Umetani et al. | |
| 4,102,923 A | 7/1978 | Pepperman, Jr. et al. | |
| 4,145,463 A | 3/1979 | Cole | |
| 4,228,100 A | 10/1980 | Frank | |
| 4,265,945 A | 5/1981 | Frank | |
| 4,842,609 A | 6/1989 | Johnson | |
| 4,909,805 A | 3/1990 | Smith | |
| 4,918,795 A | 4/1990 | Dischler | |
| 5,033,143 A | 7/1991 | Love, III | |
| 5,135,541 A | 8/1992 | Cole et al. | |
| 6,546,605 B1 | 4/2003 | Emery et al. | |
| 7,713,891 B1 | 5/2010 | Li et al. | |
| 8,012,890 B1 | 9/2011 | Li et al. | |
| 2003/0157294 A1 | 8/2003 | Green | |
| 2011/0092119 A1 | 4/2011 | Cliver et al. | |
| 2011/0275264 A1 | 11/2011 | McBride et al. | |
| 2013/0252495 A1* | 9/2013 | Mayernik | .............. C09K 21/14 |
| | | | 442/142 |

FOREIGN PATENT DOCUMENTS

WO   WO 2013/062683 A2   5/2013

OTHER PUBLICATIONS

Granzow, Albrecht, "Kinetic Study of the Reaction of Tetrakis(hydroxymethyl)phosphonium Cation with Urea," *Journal of the American Chemical Society*, 99:8, Apr. 13, 1977.
Frank, Arlen W., "Synthesis and Properties of Condensed Ureidomethyl Phosphonium Salts," *Phosphorous and Sulfur and the Related Elements*, 10:2, pp. 147-152, 1981 Gordon and Breach Science Publishers, Inc., USA.
Frank, Arlen W., "Synthesis and Properties of Tetrakis(Ureidomethyl)Phosphonium Salts," *Phosphorous, Sulfur, and Silicon and the Related Elements*, 5:1, pp. 19-25, 1978 Gordon and Breach Science Publishers, Inc., Great Britain.
PCT/US2014/061999, International Search Report, International filing date Oct. 23, 2014, 5 pages.
PCT/US2014/061999, Written Opinion of the International Search Report, International filing date Oct. 23, 2014, 5 pages.
China Textile Engineering Society, "Dyeing and finishing coating and other finishing academic papers, materials selection," China Textile Engineering Society: Dyeing and Finishing Specialized Committee, Dec. 1990.

* cited by examiner

*Primary Examiner* — Lynda Salvatore
(74) *Attorney, Agent, or Firm* — Robert M. Lanning

(57) ABSTRACT

A composition comprises at least one condensed phosphorus compound. The condensed phosphorus compound is produced by reacting together in a condensation reaction a nitrogen compound and a phosphonium compound. A phosphorus-containing polymer is produced by reacting in a condensation reaction a hydroxyalkylphosphonium compound to produce an intermediate polymer and then oxidizing phosphorus atoms in the intermediate polymer to yield a polymer comprising phosphine oxide groups.

10 Claims, No Drawings

FLAME RETARDANT PRECURSORS, POLYMERS PREPARED FROM SUCH PRECURSORS, AND FLAME RESISTANT FABRICS TREATED WITH SUCH POLYMERS

CROSS-REFERENCE TO RELATED APPLICATIONS

This application claims, pursuant to 35 U.S.C. § 119(e)(1), priority to and the benefit of the filing date of U.S. Patent Application No. 61/895,718 filed on Oct. 25, 2013, which application is hereby incorporated by reference in its entirety.

TECHNICAL FIELD OF THE INVENTION

This application relates to precursors for making flame retardant, phosphorus-containing polymers, flame retardant, phosphorus-containing polymers, processes for producing such polymers, articles comprising such polymers (e.g., textile materials treated with such polymers), and processes for producing such articles.

BACKGROUND

Flame retardant, phosphorus-containing polymers are well-known in the industry. These polymers can be used to impart a degree of flame resistance to cellulose-containing fabrics, such as cotton fabrics. The polymers typically are produced by padding a tetrahydroxymethyl phosphonium compound or a phosphonium precondensate (i.e., a precondensate made by reacting a tetrahydroxymethyl phosphonium compound with a limited amount of a cross-linking agent) onto a fabric and then reacting the phosphonium compound or precondensate with a suitable cross-linking agent. In certain embodiments of such known processes, the treated fabric is heated in order to accelerate the reaction between the phosphonium compound or precondensate and the cross-linking agent, which reaction yields the desired flame retardant, phosphorus-containing polymer. While heating accelerates the reaction, heating can also volatilize a significant portion of the phosphonium compound or precondensate deposited onto the fabric. This results in waste and increased cost since the volatilized phosphonium compound or precondensate imparts no benefit to the fabric. Also, the volatilized phosphonium compound or precondensate can form a build-up on the interior surfaces of the apparatus in which the fabric is heated, and this build-up must be periodically removed to ensure proper functioning of the apparatus. The downtime and expense of cleaning the apparatus also contributes to increased cost for the treated fabric.

Further, conventional processes typically require the addition of significant amounts of cross-linking agent in order to produce the desired phosphorus-containing polymer. This is true even when a commercially-available precondensate is used, since such precondensates are made with a limited amount of cross-linking agent (less than is needed to produce the desired polymer) and this limited amount of cross-linking agent has fully reacted with phosphonium compounds in the precondensate. This complete reaction means there are no more reactive groups (on moieties derived from the cross-linking agent) available to further react and propagate formation of the desired polymer. This necessitates the use of additional cross-linking agent when the polymer is produced. While this additional cross-linking agent is necessary, the presence of large amounts of "free" cross-linking agent can lead to side reactions that compete with reactions that form the desired polymer. These side reactions can produce polymers or segments within the phosphorus-containing polymer that deleteriously affect the performance and/or stability of the polymer.

A need therefore remains for improved precursors for flame retardant, phosphorus-containing polymers, and processes for producing such polymers that do not suffer from the disadvantages described above. A need also remains for processes for producing articles (e.g., fabrics) treated with such polymers. The invention described in this application aims to satisfy such needs.

BRIEF SUMMARY OF THE INVENTION

In a first embodiment, the invention provides a precursor composition suitable for use in the production of a flame retardant, phosphorus-containing polymer. The composition comprises at least one condensed phosphorus compound. The condensed phosphorus compound is produced by reacting together in a condensation reaction:

(a) a nitrogen compound conforming to the structure of Formula (N)

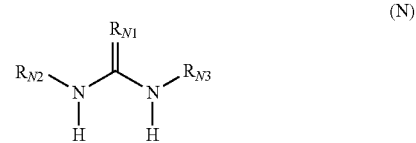

(N)

wherein $R_{N1}$ is selected from the group consisting of an oxygen atom, a sulfur atom, and a N—H group, and $R_{N2}$ and $R_{N3}$ are independently selected from the group consisting of hydrogen, hydrocarbyl groups, substituted hydrocarbyl groups, acyl groups, substituted acyl groups, and silyl groups; and (b) a phosphonium compound conforming to the structure of Formula (P)

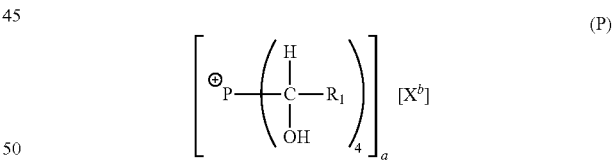

(P)

wherein the variable a is a positive integer; each $R_1$ is selected from the group consisting of hydrogen, $C_1$-$C_3$ alkyl groups, $C_1$-$C_3$ haloalkyl groups, $C_2$-$C_3$ alkenyl groups, and $C_2$-$C_3$ haloalkenyl groups; X is an anion selected from the group consisting of halides, sulfate, hydrogen sulfate, phosphate, acetate, carbonate, bicarbonate, borate, and hydroxide; b is a negative integer representing the charge of the anion X; and a is equal to (−b);

wherein the nitrogen compound and the phosphorous compound are reacted together in a ratio of 1 to about 3 molar equivalents of nitrogen compound to 1 molar equivalent of phosphonium cations; and wherein about 30 mol. % or less of the condensed phosphorus compounds contained in the composition comprise moieties conforming to the structure of Formula (B)

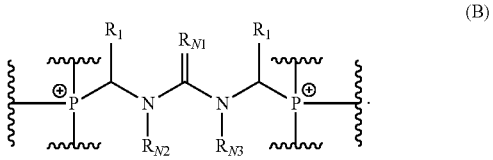

(B)

In a second embodiment, the invention provides a phosphorus-containing polymer produced by reacting in a condensation reaction a hydroxyalkylphosphonium compound to produce an intermediate polymer and then oxidizing phosphorus atoms in the intermediate polymer to yield a phosphorus-containing polymer comprising phosphine oxide groups, wherein the phosphorus-containing polymer comprises a plurality of moieties conforming to the structure of Formula (D)

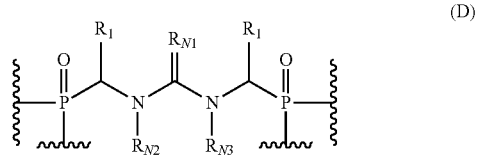

(D)

wherein each $R_1$ is selected from the group consisting of hydrogen, $C_1$-$C_3$ alkyl groups, $C_1$-$C_3$ haloalkyl groups, $C_2$-$C_3$ alkenyl groups, and $C_2$-$C_3$ haloalkenyl groups; $R_{N1}$ is selected from the group consisting of an oxygen atom, a sulfur atom, and a N—H group, and $R_{N2}$ and $R_{N3}$ are independently selected from the group consisting of hydrogen, hydrocarbyl groups, substituted hydrocarbyl groups, acyl groups, substituted acyl groups, and silyl groups; wherein the ratio of (i) the molar equivalents of carbon atoms in the polymer that are bonded to both a phosphorus atom and an $R_1$ group to (ii) the molar equivalents of carbon atoms in the polymer that are bonded to two nitrogen atoms and an $R_1$ group is 3:1 or more.

DETAILED DESCRIPTION OF THE INVENTION

As used herein, the term "hydrocarbyl groups" refers to univalent functional groups derived from hydrocarbons by removal of a hydrogen atom from a carbon atom of the hydrocarbon.

As used herein, the term "substituted hydrocarbyl groups" refers to univalent functional groups derived from substituted hydrocarbons by removal of a hydrogen atom from a carbon atom of the substituted hydrocarbon. In this definition, the term "substituted hydrocarbon" refers to compounds derived from acyclic, monocyclic, and polycyclic, unbranched and branched hydrocarbons in which (1) one or more of the hydrogen atoms of the hydrocarbon is replaced with a non-hydrogen atom (e.g., a halogen atom) or a non-hydrocarbyl functional group (e.g., a hydroxy group or heteroaryl group) and/or (2) the carbon-carbon chain of the hydrocarbon is interrupted by an oxygen atom (as in an ether), a nitrogen atom (as in an amine), or a sulfur atom (as in a sulfide).

As used herein, the term "substituted alkyl groups" refers to univalent functional groups derived from substituted alkanes by removal of a hydrogen atom from a carbon atom of the alkane. In this definition, the term "substituted alkanes" refers to compounds derived from acyclic, unbranched and branched hydrocarbons in which (1) one or more of the hydrogen atoms of the hydrocarbon is replaced with a non-hydrogen atom (e.g., a halogen atom) or a non-alkyl functional group (e.g., a hydroxy group, aryl group, or heteroaryl group) and/or (2) the carbon-carbon chain of the hydrocarbon is interrupted by an oxygen atom (as in an ether), a nitrogen atom (as in an amine), or a sulfur atom (as in a sulfide).

As used herein, the term "substituted cycloalkyl groups" refers to univalent functional groups derived from substituted cycloalkanes by removal of a hydrogen atom from a carbon atom of the cycloalkane. In this definition, the term "substituted cycloalkanes" refers to compounds derived from saturated monocyclic and polycyclic hydrocarbons (with or without side chains) in which (1) one or more of the hydrogen atoms of the hydrocarbon is replaced with a non-hydrogen atom (e.g., a halogen atom) or a non-alkyl functional group (e.g., a hydroxy group, aryl group, or heteroaryl group) and/or (2) the carbon-carbon chain of the hydrocarbon is interrupted by an oxygen atom, a nitrogen atom, or a sulfur atom.

As used herein, the term "substituted aryl groups" refers to univalent functional groups derived from substituted arenes by removal of a hydrogen atom from a ring carbon atom. In this definition, the term "substituted arenes" refers to compounds derived from monocyclic and polycyclic aromatic hydrocarbons in which one or more of the hydrogen atoms of the hydrocarbon is replaced with a non-hydrogen atom (e.g., a halogen atom) or a non-alkyl functional group (e.g., a hydroxy group).

As used herein, the term "acyl groups" refers to univalent functional groups derived from alkyl carboxylic acids by removal of a hydroxy group from a carboxylic acid group. In this definition, the term "alkyl carboxylic acids" refers to acyclic, unbranched and branched hydrocarbons having one or more carboxylic acid groups.

As used herein, the term "substituted acyl groups" refers to univalent functional groups derived from substituted alkyl carboxylic acids by removal of a hydroxy group from a carboxylic acid group. In this definition, the term "substituted alkyl carboxylic acids" refers to compounds having one or more carboxylic acid groups bonded to a substituted alkane, and the term "substituted alkane" is defined as it is above in the definition of substituted alkyl groups.

In a first embodiment, the invention provides a composition comprising at least one condensed phosphorus compound. In this context, the term "condensed phosphorus compound" is used to refer to a phosphorus-containing compound that is produced by a condensation reaction between two compounds. In particular, the condensed phosphorus compound is produced by a condensation reaction between a nitrogen compound and a phosphonium compound.

The nitrogen compound preferably conforms to the structure of Formula (N)

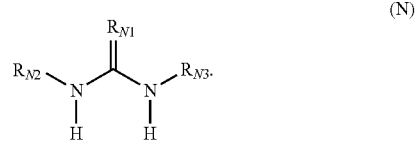

(N)

In the structure of Formula (N), $R_{N1}$ is selected from the group consisting of an oxygen atom, a sulfur atom, and a N—H group. In a preferred embodiment, $R_{N1}$ is an oxygen atom. The groups $R_{N2}$ and $R_{N3}$ are independently selected from the group consisting of hydrogen, hydrocarbyl groups, substituted hydrocarbyl groups, acyl groups, and silyl groups. Preferably, $R_{N2}$ and $R_{N3}$ are independently selected from the group consisting of hydrogen, alkyl groups, substituted alkyl groups, cycloalkyl groups, substituted cycloalkyl groups, aryl groups, substituted aryl groups, acyl groups, substituted acyl groups, and silyl groups. More preferably, $R_{N2}$ and $R_{N3}$ are independently selected from the group consisting of hydrogen, $C_1$-$C_{10}$ alkyl groups, and $C_1$-$C_{10}$ hydroxyalkyl groups (e.g., methylol groups). In one specific preferred embodiment, $R_{N1}$ is an oxygen atom, and $R_{N2}$ and $R_{N3}$ are both hydrogen atoms, meaning that the nitrogen compound is urea.

The phosphonium compound preferably conforms to the structure of Formula (P)

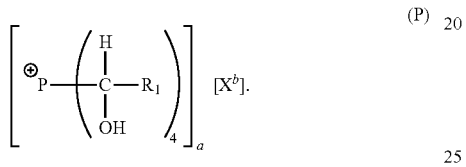

In the structure of Formula (P), the variable a is a positive integer. Each $R_1$ is selected from the group consisting of hydrogen, $C_1$-$C_3$ alkyl groups, $C_1$-$C_3$ haloalkyl groups, $C_2$-$C_3$ alkenyl groups, and $C_2$-$C_3$ haloalkenyl groups. X is an anion suitable for balancing the charge of the phosphonium cation and can be any suitable monatomic or polyatomic anion. The anion X preferably is selected from the group consisting of halides, sulfate, hydrogen sulfate, phosphate, acetate, carbonate, bicarbonate, borate, and hydroxide. The variable b is a negative integer representing the charge of the anion X. The variable a is equal to (−b). In a preferred embodiment, each $R_1$ is selected from the group consisting of hydrogen and $C_1$-$C_3$ alkyl. In a more preferred embodiment, each $R_1$ is hydrogen. Examples of phosphonium compounds that are suitable for use in the invention include, but are not limited to, tetrahydroxymethyl phosphonium salts, such as tetrahydroxymethyl phosphonium chloride, tetrahydroxymethyl phosphonium sulfate, tetrahydroxymethyl phosphonium acetate, tetrahydroxymethyl phosphonium carbonate, tetrahydroxymethyl phosphonium borate, and tetrahydroxymethyl phosphonium phosphate.

As noted above, the nitrogen compound and the phosphorus compound react with each other in a condensation reaction to produce the condensed phosphorus compound. The nitrogen compound and the phosphorus compound preferably are reacted in an amount of 1 to about 3 molar equivalents of nitrogen compound to 1 molar equivalent of phosphonium cations, more preferably 1 to about 2.5 molar equivalents of nitrogen compound to 1 molar equivalent of phosphonium cations, more preferably 1 to about 2 molar equivalents of nitrogen compound to 1 molar equivalent of phosphonium cations, and most preferably 1 to about 1.5 molar equivalents of nitrogen compound to 1 molar equivalent of phosphonium cations. Since the phosphonium cation is the reactive species and phosphonium compounds can contain multiple phosphonium cations, the ratios set forth above are based on the amounts of nitrogen compound and phosphonium cations present in the reactant mixture. To calculate the molar equivalents of phosphonium cations present in the reactant mixture, one simply multiplies the molar amount of phosphonium compound in the reactant mixture by the number of phosphonium cations present in each formula unit of the phosphonium compound. If the reactant mixture used to produce the condensed phosphorus compound contains more than one nitrogen compound and/or more than one phosphonium compound, the ratios of nitrogen compound to phosphonium cations recited above are calculated using the total molar equivalents of all of the nitrogen compounds and the total molar equivalents of all of the phosphonium cations present in the reactant mixture.

As will be understood by those skilled in the art, the composition of the invention can contain a mixture of different condensed phosphorus compounds. The nitrogen compound and the phosphonium compound both contain at least two reactive sites (i.e., sites at which the condensation reaction can occur). In the reaction system that yields the condensed phosphorus compound(s), each molecule of the nitrogen compound and the phosphonium compound can therefore undergo different reactions or combinations of reactions to yield different condensed phosphorus compounds. For example, each molecule of the nitrogen compound can react with one or two hydroxyalkyl groups (from the phosphonium compound). Further, each molecule of the phosphonium compound can react (through its hydroxyalkyl groups) with from 1 to 4 molecules of the nitrogen compound. These different possible reaction pathways can result in a composition containing a mixture of different condensed phosphorus compounds.

Preferably, the composition contains a relatively low amount of the condensed phosphorus compounds that would be produced when a molecule of the nitrogen compound reacts with two molecules of the phosphonium compound. Such a condensed phosphorus compound comprises at least one moiety conforming to the structure of Formula (B)

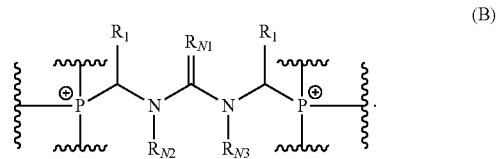

In the structure of Formula (B), the partial bonds (i.e., the bonds truncated by the wavy line) represent bonds to other groups or moieties, such as hydroxyalkyl groups or moieties produced by the reaction of a hydroxyalkyl group with a molecule of the nitrogen compound. $R_1$, $R_{N1}$, $R_{N2}$, and $R_{N3}$ are the same as those described above in connection with the structures of Formulae (N) and (P). Preferably, 30 mol. % or less of the condensed phosphorus compounds contained in the composition comprise moieties conforming to the structure of Formula (B). More preferably, about 20 mol. % or less of the condensed phosphorus compounds contained in the composition comprise moieties conforming to the structure of Formula (B).

The amount of the bridging species represented by the structure of Formula (B) can alternatively be expressed with reference to the percentage of certain carbon atoms contained in the condensed phosphorus compounds in the composition. In particular, the amount can be expressed with reference to the carbon atoms in the condensed phosphorus compounds that are double-bonded to an $R_{N1}$ group. Preferably, about 50 mol. % or less of these carbon atoms (i.e., carbon atoms in the condensed phosphorus compound(s) that are double-bonded to an $R_{N1}$ group) are contained in a moiety conforming to the structure of Formula (B). More preferably, about 40 mol. % or less, about 30 mol. % or less, or about 20 mol. % or less of these carbon atoms are contained in a moiety conforming to the structure of Formula (B).

Applicants have found that condensed phosphorus compounds containing moieties conforming to the structure of Formula (B) are predominant in commercially-available precondensate compositions. When such commercially available precondensate compositions are produced, the nitrogen compound typically is present in the reactant mixture in a relatively low amount as compared to the phosphonium compound (i.e., the phosphonium compound is present in a molar excess). Further, the nitrogen compound and the phosphonium compound are reacted under conditions that drive the nitrogen compound to react completely. The reaction results in condensed phosphorus compounds containing moieties conforming to the structure of Formula (B). While these reaction conditions can produce a stable precondensate when the phosphonium compound is present in a molar excess, Applicants have found that such reaction conditions produce an unstable or gelled composition when the nitrogen compound is present in a molar excess, as is required to produce the composition of the invention.

As noted above, the composition preferably contains condensed phosphorus compounds in which the nitrogen compound has reacted with only one hydroxyalkyl group, thereby leaving a reactive site free for reaction when the composition and condensed phosphorus compound is later used to generate a polymer as described below. Thus, the composition preferably contains at least one condensed phosphorus compound conforming to the structure of Formula (M)

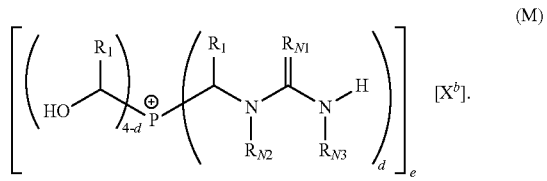

In the structure of Formula (M), the variable d is an integer from 1 to 3, and e is a positive integer equal to (−b). $R_1$, $R_{N1}$, $R_{N2}$, $R_{N3}$, X, and the variable b are the same as those described above in connection with the structures of Formulae (N) and (P). In a preferred embodiment, about 50 mol. % or more of the phosphorus atoms present in condensed phosphorus compounds in the composition are present in condensed phosphorus compounds conforming to the structure of Formula (M). More preferably, about 55 mol. % or more, about 60 mol. % or more, or about 65 mol. % or more of the phosphorus atoms present in condensed phosphorus compounds in the composition are present in condensed phosphorus compounds conforming to the structure of Formula (M).

In another preferred embodiment, the composition preferably contains a relatively low amount of the condensed phosphorus compounds produced when the phosphonium compound has reacted with four molecules of the nitrogen compound. Such condensed phosphorus compounds conform to the structure of Formula (T)

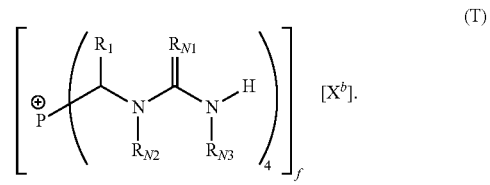

In the structure of Formula (T), the variable f is a positive integer equal to (−b). $R_1$, $R_{N1}$, $R_{N2}$, $R_{N3}$, X, and the variable b are the same as those described above in connection with the structures of Formulae (N) and (P). While not wishing to be bound to any particular theory, Applicants believe that such condensed phosphorus compounds are not desirable because the condensed phosphorus compound no longer contains hydroxyalkyl groups that are available to react when the composition and condensed phosphorus compound is later used to generate a polymer as described below. In a preferred embodiment, about 10 mol. % or less, more preferably about 5 mol. % or less, and most preferably about 1 mol. % or less of the phosphorus atoms present in condensed phosphorus compounds in the composition are present in condensed phosphorus compounds conforming to the structure of Formula (T).

The composition of the invention can contain other components in addition to the condensed phosphorus compounds described above. For example, the composition can contain unreacted nitrogen compound and unreacted phosphonium compound. However, the unreacted nitrogen compound and unreacted phosphonium compound preferably are present in relatively low amounts relative to the condensed phosphorus compounds. Preferably, about 40 mol. % or less, more preferably about 30 mol. % or less, and most preferably about 20 mol. % or less of the phosphorus atoms present in the composition are contained in unreacted phosphonium compounds conforming to the structure of Formula (P). In another preferred embodiment, the composition contains about 20 mol. % or less, more preferably about 15 mol. % or less of unreacted nitrogen compounds conforming to the structure of Formula (N).

The composition can be made by any suitable process. As noted above, the relatively high amount of nitrogen compound used in producing the condensed phosphorus compound(s) requires different reaction conditions than those typically used to produce conventional precondensate compositions, where the phosphonium compound is present in a molar excess. In one preferred embodiment, the composition is produced by combining the desired amounts of the nitrogen compound and the phosphonium compound in a suitable medium (e.g., an aqueous medium) having a pH of about 3 to about 4 and heating the mixture under controlled conditions to a temperature of about 50 to about 75° C. (preferably about 60° C.) for a period of time sufficient for the condensation reaction to occur to the desired degree. Various phosphonium compounds are commercially-available in the form of aqueous solutions containing the phosphonium compound. For example, a 75% solution of THPS is commercially available. These prepared solutions of the phosphonium compound can be used as purchased to provide both the phosphonium compound and a medium for the reaction with the nitrogen compound. The nitrogen compound need only be dissolved in the solution, which can be accomplished by gentle heating of the mixture (preferably to a temperature that does not exceed about 35° C.) until the nitrogen compound fully dissolves, after which the reactant mixture can be heated to an elevated temperature as described above.

The amount of time for the reaction will depend, at least in part, on the relative amounts of the two reactants and the pH of the reaction medium. Preferably, the reactants are held at the elevated temperature and allowed to react for about 5 to about 10 hours, with shorter times usually providing satisfactory results at lower pH levels. The progress of the reaction can be monitored quantitatively with nuclear magnetic resonance (NMR) spectroscopy to determine the amount condensed phosphorus compounds that have been produced. Alternatively, the progress of the reaction can be monitored qualitatively with viscometry. As the reaction progresses, the viscosity of the reaction medium will increase, and the increasing viscosity correlates well with the quantitative data obtained from NMR spectroscopy. Preferably, the reactants are held at the elevated temperature and allowed to react until the viscosity of the system is about 90 to about 100 cPs. Once the reaction has progressed to the desired degree, the resulting composition preferably is rapidly cooled to ambient temperature (e.g., about 20 to about 30° C.).

The above-described reaction conditions are believed to stand in contrast to the conditions typically used to produce a precondensate from a nitrogen compound and a phosphonium compound. The conditions used to produce such precondensates are believed to be much harsher, involving higher reaction temperatures and/or longer reaction times, which lead to the complete reaction of the nitrogen compound (both hydrogen atoms on the nitrogen compound react with the phosphonium compound). As noted above, these reaction conditions will yield an unstable or gelled composition when a molar excess of the nitrogen compound is used.

The composition of the invention is suitable for use in the production of flame retardant, phosphorus-containing polymers, such as the polymers that are frequently applied to textile materials to yield flame resistant garments. In this use, the condensed phosphorus compound(s) present in the composition serve as a precondensate of the two components typically used to form such flame retardant, phosphorus-containing polymers, namely a phosphonium compound and a nitrogen compound. In order to produce such a polymer, the composition of the invention is heated to an elevated temperature (e.g., about 140 to about 180° C.), at which temperature the condensed phosphorus compounds in the composition will react with each other in a condensation reaction that ultimately yields a cross-linked polymer that is the desired flame retardant, phosphorus-containing polymer. Because the composition of the invention was produced with a relatively high amount of the nitrogen compound, the composition of the invention can produce the polymer with little or no additional nitrogen compound being added to the system. (Commercially-available precondensates typically require large amounts of additional nitrogen compound to be added in order for the system to cure to provide the desired polymer. This is due to the fact that such precondensates are produced with relatively little nitrogen compound, much less than is required for the system to properly cure to yield the desired polymer.)

Applicants believe that the benefits of the composition of the invention are readily apparent. First, the ability to use the composition of the invention in a single component system can reduce the complexity inherent in properly mixing multiple components in a manufacturing facility. Second, the composition of the invention typically produces a much lower amount of volatile by-products as compared to commercially-available precondensates. Commercially-available precondensates typically contain a relatively large amount of unreacted phosphonium compound, which is relatively volatile and evaporates during the curing of the polymer. By way of contrast, the composition of the invention contains a lower amount of unreacted phosphonium compound. Further, the condensed phosphorus compounds in the composition of the invention have a higher molecular weight than the unreacted phosphonium compound, which means that the compounds are less volatile than the unreacted phosphonium compound. Both of these factors mean that the composition of the invention contains a lower amount of volatile components and, therefore, the composition will produce fewer volatile by-products when used to produce the polymer. Third, Applicants believe that the single component system possible with the composition of the invention produces a more ideal and robust polymer. While not wishing to be bound to any particular theory, Applicants believe that the large amounts of additional nitrogen compound that must be used with commercially-available precondensates can result in undesirable side reactions that compete with the formation of the desired flame retardant, phosphorus-containing polymer. For example, it is believed that the nitrogen compound (e.g., ammonia or urea) can react with aldehydes (they evolve from the phosphonium compound when it is heated) to produce a nitrogen-aldehyde polymer or polymer segment (e.g., an ammonia-formaldehyde polymer/polymer segment or a urea-formaldehyde polymer/polymer segment). It is also believed that such nitrogen-aldehyde polymer segments can become incorporated into the phosphorus-containing polymer, where the segments can deleteriously affect the flame retardance and/or hydrolytic stability of the polymer as a whole. The composition of the invention, which requires little to no additional nitrogen compound to properly cure, is able to produce the desired polymer without an appreciable extent of these undesired side reactions.

When the composition is used to produce a flame retardant, phosphorus-containing polymer on a textile material, the composition typically is applied to a fabric using standard textile finishing equipment, such as padding or spraying equipment. Accordingly, the composition preferably is sufficiently fluid to be used in conventional textile finishing equipment. For example, the composition preferably is an aqueous solution or dispersion. Preferably, the composition has a viscosity of about 150 cP or less at 20° C.

In a second embodiment, the invention provides a phosphorus-containing polymer. The polymer comprises a plurality of phosphorus atoms. Most of these phosphorus atoms are present in the "backbone" of the polymer, meaning that the phosphorus atoms are joined together by intervening linking moieties. This is in contrast to some phosphorus-containing polymers in which the phosphorus atoms are contained in pendant groups that are attached to the polymer backbone. The phosphorus-containing polymer can be made by the condensation reaction of a hydroxyalkylphosphonium compound.

The phosphorus-containing polymer comprises a plurality of moieties conforming to the structure of Formula (D)

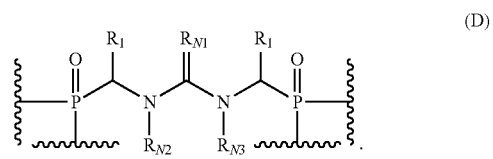

In the structure of Formula (D), $R_1$, $R_{N1}$, $R_{N2}$, and $R_{N3}$ are selected from the groups discussed above in connection with the composition embodiment of the invention. As in the other structures set forth in this application, the partial bonds (i.e., the bonds truncated by the wavy line) represent bonds to other groups or moieties.

The phosphorus-containing polymer can comprise other moieties in addition to those moieties conforming to the structure of Formula (D). For example, the polymer can comprise moieties conforming to the structure of Formula (H)

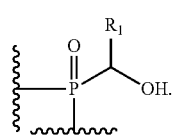

(H)

In the structure of Formula (H), $R_1$ is selected from the groups discussed above in connection with the composition embodiment of the invention. As in the other structures set forth in this application, the partial bonds (i.e., the bonds truncated by the wavy line) represent bonds to other groups or moieties. As is evident from the structure of Formula (H), Such groups terminate the propagation of the polymer chain. Therefore, the polymer of the invention preferably contains relatively few moieties conforming to the structure of Formula (H). In a preferred embodiment, the ratio of (i) the molar equivalents of carbon atoms in the polymer that are bonded to both a phosphorus atom and an $R_1$ group (such as the two carbon atoms in the structure of Formula (D)) to (ii) the molar equivalents of carbon atoms in the polymer that are bonded to a phosphorus atom, an $R_1$ group, and an oxygen atom (such as the carbon atom in the structure of Formula (H)) is 8:1 or more. (In other words, the value of (i) is at least eight times the value of (ii).) In a more preferred embodiment, this ratio is about 10:1 or more, about 15:1 or more, or about 16:1 or more.

The polymer can also comprise moieties conforming to the structure of Formula (E)

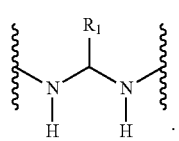

(E)

In the structure of Formula (E), $R_1$ is selected from the groups discussed above in connection with the composition embodiment of the invention. As in the other structures set forth in this application, the partial bonds (i.e., the bonds truncated by the wavy line) represent bonds to other groups or moieties. The phosphorus-containing polymer can contain such moieties if, for example, the production of the polymer involves the condensation reaction of a hydroxyalkylphosphonium compound with ammonia. In another more specific embodiment, the polymer can comprise moieties conforming to the structure of Formula (F)

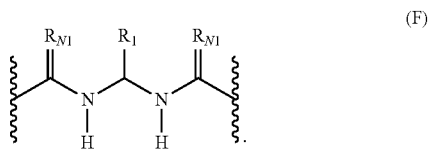

(F)

In the structure of Formula (F), $R_1$, $R_{N1}$, $R_{N2}$, and $R_{N3}$ are selected from the groups discussed above in connection with the composition embodiment of the invention. As in the other structures set forth in this application, the partial bonds (i.e., the bonds truncated by the wavy line) represent bonds to other groups or moieties. The phosphorus-containing polymer can contain such moieties if, for example, the production of the polymer involves the condensation reaction of a hydroxyalkylphosphonium compound with a nitrogen compound conforming to the structure of Formula (N).

As can be seen from the structures of Formulae (E) and (F), these moieties are produced by the condensation reaction of an aldehyde (which evolves from the hydroxyalkylphosphonium compound) with a nitrogen compound. Such a reaction is undesired since it competes with the desired condensation reaction that yields (after oxidation of the polymer) a moiety conforming to the structure of Formula (D). Further, while not wishing to be bound to any particular theory, it is believed that the moieties conforming to the structures of Formulae (E) and (F) are hydrolytically unstable under highly alkaline conditions, such as those frequently encountered in industrial laundering processes. Thus, a polymer containing such moieties can degrade after exposure to these highly alkaline conditions—a result that would not be desirable if the polymer has been applied to a textile material to produce a flame resistant garment.

Given the deleterious effects attributable to the presence of moieties in which a carbon atom is bonded to two nitrogen atoms and an $R_1$ group, such as the moieties conforming to the structures of Formulae (E) and (F), the polymer of the invention preferably contains a relatively low amount of such moieties. In a preferred embodiment, the ratio of (i) the molar equivalents of carbon atoms in the polymer that are bonded to both a phosphorus atom and an $R_1$ group (such as the two carbon atoms in the structure of Formula (D)) to (ii) the molar equivalents of carbon atoms in the polymer that are bonded to two nitrogen atoms and an $R_1$ group (such as the carbon atoms in the structures of Formulae (E) and (F)) is 3:1 or more. (In other words, the value of (i) is at least three times the value of (ii).) In a more preferred embodiment, this ratio is about 5:1 or more, about 10:1 or more, about 15:1 or more, or about 18:1 or more.

The ratio of carbon atoms in the polymer described above can be determined by solid-state $^{13}C$ NMR spectroscopy. For example, cross polarization magic angle spinning (CP-MAS) solid-state NMR can be used to acquire the $^{13}C$ NMR spectra. In such a procedure, the solid samples can be spun in a 4 mm rotor at 8 kHz around the magic angle and a two millisecond cross polarization mixing time used. In the resulting spectra, carbon atoms in different moieties exhibit different chemical shifts. The carbon atoms in the polymer that are bonded to both a phosphorus atom and an $R_1$ group exhibit peaks at chemical shifts of approximately 56 ppm and 36 ppm. The peak at a chemical shift of approximately 56 ppm corresponds to the carbon atoms in the structure of Formula (H). The peak at a chemical shift of approximately 36 ppm corresponds to the carbon atoms in the structure of Formula (D). The carbon atoms in the polymer that are bonded to two nitrogen atoms and an $R_1$ group exhibit a chemical shift of approximately 46 ppm.

In order to quantify the relative amount of carbon atoms in each moiety, the resulting NMR spectra can be analyzed using global peak deconvolution (line fitting) performed by suitable analytical software, such as Mnova 6.0 software, with peak position, width, and Lorentzian/Gaussian character being the independent variables. In this method, the fitting iterations are continued until an acceptable fit is achieved. The resulting "deconvoluted" spectrum then shows a series of separate peaks at each chemical shift, and the area under these separate peaks (or at least a portion of the separate peaks) can be used to determine the relative amounts of each different carbon atom.

As is evident from the structure of Formula (D), at least a portion of the phosphorus atoms in the polymer are present in phosphine oxide moieties. Preferably, about 75% or more of the phosphorus atoms in the polymer are present in phosphine oxide moieties. More preferably, about 80% or more of the phosphorus atoms in the phosphorus-containing polymer are present in phosphine oxide moieties. Most preferably, about 85% or more (e.g., about 90% or more) of the phosphorus atoms in the phosphorus-containing polymer are present in phosphine oxide moieties.

The amount of phosphorus atoms present in each of the oxidation states and corresponding moieties can be determined by any suitable method. Since the amounts and ranges provided above refer to the amounts of atoms throughout the polymer, the method used to characterize the phosphorus atoms in the polymer should be selected so that it can characterize atoms located throughout the polymer, rather than only those atoms proximate to the surface of the polymer film. Preferably, the polymer is analyzed using solid state $^{31}P$ NMR using a direct acquire Bloch decay pulse sequence (direct excitation and detection on phosphorus run with proton decoupling). In order to increase the resolution of the NMR spectra, the samples should be spun at 11 kHz at the magic angle with respect to the direction of the magnetic field. This magic angle spinning results in spinning sidebands emanating from the isotropic peak at 11 kHz periods. In the resulting spectra, phosphorus atoms in different oxidation states exhibit different chemical shifts. Phosphorus atoms in phosphine moieties exhibit an isotropic peak at a chemical shift of approximately −27 ppm. Phosphorus atoms in phosphonium moieties exhibit an isotropic peak at a chemical shift of approximately 28 ppm with sidebands at approximately −80 ppm and 81 ppm. Phosphorus atoms in phosphine oxide moieties exhibit an isotropic peak at a chemical shift of approximately 45 ppm with sidebands at approximately −65 ppm, −11 ppm, and 153 ppm. The isotropic peaks and the sideband peaks at these different chemical shifts can be used to both qualitatively confirm the presence of phosphorus atoms in a given oxidation state and to quantify the relative amount of phosphorus atoms in each oxidation state. In order to quantify the relative amount of phosphorus atoms in each oxidation state, the resulting NMR spectra can be analyzed using global peak deconvolution (line fitting) as described above in connection with the discussion of the $^{13}C$ NMR spectroscopy.

The polymer of the invention can be made by any suitable process. In one embodiment, the polymer is made by reacting in a condensation reaction a hydroxyalkylphosphonium compound to produce an intermediate polymer and then oxidizing phosphorus atoms in the intermediate polymer to yield a phosphorus-containing polymer comprising phosphine oxide groups. As under herein, the term "hydroxyalkylphosphonium compound" refers to a compound comprising a phosphonium group and having at least one hydroxyalkyl group attached to the phosphonium group. The hydroxyalkylphosphonium compound can be any suitable compound meeting the definition above. In a preferred embodiment, the hydroxyalkylphosphonium compound conforms to the structure of Formula (M) set forth above. Such a hydroxyalkylphosphonium compound can be provided in any suitable form or composition. In a preferred embodiment, the hydroxyalkylphosphonium compound is provided in the form of a composition according to the first embodiment of the invention. Thus, in such an embodiment, the polymer of the invention can be made by reacting in a condensation reaction a composition according to the first embodiment of the invention. The formation of a polymer using the composition of the invention was briefly discussed above in connection with the composition embodiment of the invention. Generally, the polymer can be produced by first adjusting the pH of the mixture to 5-6 (e.g., about 5.5) using a suitable base (e.g., a dilute NaOH solution) and heating the composition to an elevated temperature (e.g., about 140 to about 180° C.), at which temperature the condensed phosphorus compounds in the composition will react with each other in a condensation reaction that ultimately yields a cross-linked polymer that is the desired intermediate to the flame retardant, phosphorus-containing polymer. The composition can be heated to this temperature for any suitable amount of time. Provided the composition is first dried to remove a significant portion of any solvent or liquid medium (e.g., water), about 1 to about 3 minutes at temperature generally effects sufficient reaction to produce a polymer having the desired properties.

After the hydroxyalkylphosphonium compound (e.g., the condensed phosphorus compound in the composition) is reacted in the condensation reaction, the resulting intermediate polymer is then oxidized to convert at least a portion of the phosphorus atoms in the polymer to phosphine oxide moieties. The polymer can be oxidized using any suitable conditions. For example, the polymer can be oxidized immediately after the condensation reaction described above, or the intermediate polymer can first be exposed to a Brønsted base and then exposed to an oxidizing agent. The benefits of exposing the polymer to a Brønsted base and then to an oxidizing agent are described more fully in commonly-owned, U.S. Patent Application No. 61/831,131 filed on Jun. 4, 2013, which application is hereby incorporated by reference.

The Brønsted base used in such steps can be any suitable base, but strong bases, such as alkalis, are preferred. For example, sodium hydroxide (soda), potassium hydroxide (potash), calcium hydroxide (lime), or any combination thereof can be used. The Brønsted base typically is provided in the form of an aqueous solution that is applied to the intermediate polymer or in which the intermediate polymer is submerged. The Brønsted base can be contained in this solution in any suitable amount, but preferably the concentration of the base is great enough to yield a solution having a pH of about 12 or greater (e.g., about 13 or greater, or about 14). Preferably, the intermediate polymer is exposed to the Brønsted base under conditions sufficient to raise the pH of the intermediate polymer and/or the medium in which the intermediate polymer is contained to about 6 or more.

As noted above, the intermediate polymer is exposed to an oxidizing agent in order to oxidize at least a portion of the phosphorus atoms in the intermediate polymer to phosphine oxide moieties, thereby yielding the desired phosphorus-containing polymer. Suitable oxidizing agents include, but are not limited to, oxygen (e.g., gaseous oxygen), hydrogen peroxide, sodium perborate, sodium hypochlorite, percarbonate (e.g., alkaline metal percarbonates), ozone, peracetic acid, and mixtures or combinations thereof. Suitable oxidizing agents also include compounds that are capable of generating hydrogen peroxide or peroxide species, which compounds can be used alone or in combination with any of the oxidizing agents listed above. In a preferred embodiment, the oxidizing agent is selected from the group consisting of hydrogen peroxide, sodium perborate, or sodium hypochlorite, and combinations thereof, with hydrogen peroxide being particularly preferred. The amount of oxidization agent can vary depending on the actual materials used, but typically the oxidizing agent is incorporated in a solution containing about 5% or more, about 10% or more, about 15% or more, about 20% or more, about 25% or more, or about 30% or more by weight of the oxidizing agent.

If the intermediate polymer is first exposed to an oxidizing agent and then a Brønsted base, the intermediate polymer preferably is again sequentially exposed to an oxidizing agent and a Brønsted base. While not wishing to be bound to any particular theory, Applicants believe that exposure to a Brønsted base prior to the oxidation step is needed in order to convert a greater portion of the phosphorus moieties in the polymer into a state that can be converted to phosphine oxide moieties in the oxidation step.

As noted above, the phosphorus-containing polymer is believed to be suitable for use in treating textile materials to produce articles, such as flame resistant garments. Thus, in another embodiment, the invention provides an article comprising a textile material and a phosphorus-containing polymer according to the invention. The polymer in such article can be any of the polymers disclosed above in connection with the second embodiment of the invention. In the article, the polymer typically is present as a finish or coating on a surface of at least a portion of the fibers in the textile material.

The article of the invention can comprise any suitable amount of the phosphorus-containing polymer. In a preferred embodiment, the phosphorus-containing polymer is present in the article in an amount that provides about 0.5% or more (e.g., about 1% or more, about 1.5% or more, about 2% or more, about 2.5% or more, about 3% or more, about 3.5% or more, about 4% or more, or about 4.5% or more) of elemental phosphorus based on the weight of the untreated textile material. In another preferred embodiment, the phosphorus-containing polymer is present in the article in an amount that provides about 5% or less (e.g., about 4.5% or less, about 4% or less, about 3.5% or less, about 3% or less, about 2.5% or less, about 2% or less, about 1.5% or less, or about 1% or less) of elemental phosphorus based on the weight of the untreated textile material. Preferably, the phosphorus-containing polymer is present in the article in an amount that provides about 1% to about 4%, about 1% to about 3%, or about 1% to about 2.5% of elemental phosphorus based on the weight of the untreated textile material.

The textile material used in this embodiment of the invention can be any suitable textile material. The textile material generally comprises a fabric formed from one or more pluralities or types of yarns. The textile material can be formed from a single plurality or type of yarn (e.g., the fabric can be formed solely from yarns comprising a blend of cellulosic fibers and synthetic fibers, such as polyamide fibers), or the textile material can be formed from several pluralities or different types of yarns (e.g., the fabric can be formed from a first plurality of yarns comprising cellulosic fibers and polyamide fibers and a second plurality of yarns comprising an inherent flame resistant fiber).

The yarns used in making the textile materials of the invention can be any suitable type of yarn. Preferably, the yarns are spun yarns. In such embodiments, the spun yarns can be made from a single type of staple fiber (e.g., spun yarns formed solely from cellulose fibers or spun yarns formed solely from inherent flame resistant fibers), or the spun yarns can be made from a blend of two or more different types of staple fibers (e.g., spun yarns formed from a blend of cellulose fibers and thermoplastic synthetic staple fibers, such as polyamide fibers). Such spun yarns can be formed by any suitable spinning process, such as ring spinning, air-jet spinning, or open-end spinning. In certain embodiments, the yarns are spun using a ring spinning process (i.e., the yarns are ring spun yarns).

The textile materials of the invention can be of any suitable construction. In other words, the yarns forming the textile material can be provided in any suitable patternwise arrangement producing a fabric, such as a woven or knit construction. In one preferred embodiment, the textile material is provided in a woven construction, such as a plain weave, basket weave, twill weave, satin weave, or sateen weave. Suitable plain weaves include, but are not limited to, ripstop weaves produced by incorporating, at regular intervals, extra yarns or reinforcement yarns in the warp, fill, or both the warp and fill of the textile material during formation. Suitable twill weaves include both warp-faced and fill-faced twill weaves, such as 2/1, 3/1, 3/2, 4/1, 1/2, 1/3, or 1/4 twill weaves. In certain embodiments of the invention, such as when the textile material is formed from two or more pluralities or different types of yarns, the yarns are disposed in a patternwise arrangement in which one of the yarns is predominantly disposed on one surface of the textile material. In other words, one surface of the textile material is predominantly formed by one yarn type. Suitable patternwise arrangements or constructions that provide such a textile material include, but are not limited to, satin weaves, sateen weaves, and twill weaves in which, on a single surface of the fabric, the fill yarn floats and the warp yarn floats are of different lengths.

In another preferred embodiment, the textile material is a knit textile material. The knit textile material can be produced from a single plurality or type of yarn (e.g., the fabric can be formed solely from yarns comprising cellulosic fibers), or the knit textile material can be produced from two or more different types of yarns (e.g., the fabric can be formed from a first plurality of yarns comprising cellulosic fibers and a second plurality of yarns comprising synthetic filaments). In a knit fabric comprising two different types of yarns, the knit fabric can be constructed so that the two yarns run parallel through the fabric and together form the interlocking loops of the knit. Alternatively, the knit fabric can be constructed so that one of the yarns forms the interlocking loops of the knit and the other yarn is tucked into those loops at regular intervals in the knit. In this latter arrangement, the other yarn typically is tucked behind one loop in the knit and then skips over one or more adjacent loops in the same row before it is tucked behind another loop in the knit. This pattern will result in the tucked yarn being predominantly disposed on one surface of the textile material so that each surface of the textile material is predominantly formed by a different type yarn.

Preferably, the textile material comprises cellulosic fibers. As utilized herein, the term "cellulosic fibers" refers to fibers composed of, or derived from, cellulose. Examples of suitable cellulosic fibers include cotton, linen, jute, hemp, regenerated cellulose, cellulose acetate, and combinations, mixtures, or blends thereof. The term "regenerated cellulose fibers" is utilized herein to refer to fibers made by dissolving cellulose in a suitable solvent and then spinning or extruding the solution in an appropriate medium so that the cellulose precipitates or coagulates in the form of filaments or fibers. There are several different types of regenerated cellulose fibers available. Suitable regenerated cellulose fibers include, but are not limited to, rayon fibers (e.g., viscose rayon fibers, high wet modulus rayon fibers, modal fibers, and polynosic fibers), lyocell fibers, and mixtures thereof. Among these, the regenerated cellulose fibers preferably are selected from the group consisting of rayon fibers, lyocell fibers, and mixtures thereof. Further, the regenerated cellulose fibers preferably are lyocell fibers. Regenerated cellulose fibers typically exhibit a degree of softness and moisture regain that makes them particularly useful in producing textile materials that are comfortable when worn. However, some regenerated cellulose fibers suffer from relatively low tenacity (especially wet tenacity). The weakness of such regenerated cellulose fibers means that they cannot be used in textile materials in large amounts without sacrificing the durability of the textile material. Therefore, the regenerated cellulose fibers utilized in the embodiments of the invention preferably exhibit a relatively high tenacity, both when dry and when wet. More specifically, the regenerated cellulose fibers preferably exhibit a dry tenacity of about 27 cN/tex or more, more preferably about 30 cN/tex or more, and most preferably about 35 cN/tex or more. The regenerated cellulose fibers also preferably exhibit a wet tenacity of about 20 cN/tex or more or about 25 cN/tex or more. In one preferred embodiment of the article, the cellulosic fibers in the textile material are cotton fibers. In another preferred embodiment of the article, the cellulosic fibers in the textile material are regenerated cellulose fibers, most preferably lyocell fibers.

In those embodiments of the textile material comprising cotton fibers, the cotton fibers can be of any suitable variety. Generally, there are two varieties of cotton fibers that are readily available for commercial use in North America: the Upland variety (*Gossypium hirsutum*) and the Pima variety (*Gossypium barbadense*). The cotton fibers used as the cellulosic fibers in the invention can be cotton fibers of either the Upland variety, the Pima variety, or a combination, mixture, or blend of the two. Generally, cotton fibers of the Upland variety, which comprise the majority of the cotton used in the apparel industry, have lengths ranging from about 0.875 inches to about 1.3 inches, while the less common fibers of the Pima variety have lengths ranging from about 1.2 inches to about 1.6 inches. In a preferred embodiment, at least some of the cotton fibers used in the textile material are of the Pima variety, which are preferred due to their greater, more uniform length.

In those embodiments in which the textile material comprises cellulosic fibers, the cellulosic fibers can be present in the yarns making up the textile material in any suitable amount. For example, in preferred embodiments, the cellulosic fibers can comprise about 20% or more (e.g., about 30% or more), by weight, of the fibers present in one of the pluralities or types of yarn used in making the textile material. In a possibly preferred embodiment, the cellulosic fibers can comprise about 100%, by weight, of the fibers used in making the textile material. In certain other preferred embodiments, the yarn can include non-cellulosic fibers. In such preferred embodiments, the cellulosic fibers can comprise about 20% to about 100% (e.g., about 30% to about 90%), by weight, of the fibers present in one of the pluralities or types of yarn used in making the textile material. The remainder of the yarn can be made up of any suitable non-cellulosic fiber or combination of non-cellulosic fibers, such as the thermoplastic synthetic fibers and inherent flame resistant fibers discussed below.

In those embodiments in which the textile material comprises cellulosic fibers, the cellulosic fibers can be present in the textile material in any suitable amount. For example, in certain embodiments, the cellulosic fibers can comprise about 15% or more, about 20% or more, about 25% or more, about 30% or more, or about 35% or more, by weight, of the fibers present in the textile material. While the inclusion of cellulosic fibers can improve the comfort of the textile material (e.g., improve the hand and moisture absorbing characteristics), the exclusive use of cellulosic fibers can deleteriously affect the durability of the textile material. Accordingly, it may be desirable to use other fibers (e.g., synthetic fibers) in combination with the cellulosic fibers in order to achieve a desired level of durability. Thus, in such embodiments, the cellulosic fibers can comprise about 95% or less or about 90% or less, by weight, of the fibers present in the textile material. More specifically, in certain embodiments, the cellulosic fibers can comprise about 15% to about 95%, about 20% to about 95%, about 25% to about 95%, about 30% to about 95%, or about 30% to about 90%, by weight, of the fibers present in the textile material.

In certain embodiments of the invention, one or more of the yarns in the textile material can comprise thermoplastic synthetic fibers. For example, the yarn can comprise a blend of cellulosic fibers and thermoplastic synthetic fibers. These thermoplastic synthetic fibers typically are included in the textile material in order to increase its durability to, for example, industrial washing conditions. In particular, thermoplastic synthetic fibers tend to be rather durable to abrasion and harsh washing conditions employed in industrial laundry facilities and their inclusion in, for example, a cellulosic fiber-containing spun yarn can increase that yarns durability to such conditions. This increased durability of the yarn, in turn, leads to an increased durability for the textile material. Suitable thermoplastic synthetic fibers include, but are not necessarily limited to, polyester fibers (e.g., poly(ethylene terephthalate) fibers, poly(propylene terephthalate) fibers, poly(trimethylene terephthalate) fibers, poly(butylene terephthalate) fibers, and blends thereof), polyamide fibers (e.g., nylon 6 fibers, nylon 6,6 fibers, nylon 4,6 fibers, and nylon 12 fibers), polyvinyl alcohol fibers, and combinations, mixtures, or blends thereof.

In those embodiments in which the textile material comprises thermoplastic synthetic fibers, the thermoplastic synthetic fibers can be present in one of the pluralities or types of yarn used in making the textile material in any suitable amount. In certain preferred embodiments, the thermoplastic synthetic fibers comprise about 65% or less, about 60% or less, or about 50% or less, by weight, of the fibers present in one of the pluralities or types of yarn used in making the textile material. In certain preferred embodiments, the thermoplastic synthetic fibers comprise about 5% or more or about 10% or more, by weight, of the fibers present in one of the pluralities or types of yarn used in making the textile material. Thus, in certain preferred embodiments, the thermoplastic synthetic fibers comprise about 0% to about 65% (e.g., about 5% to about 65%), about 5% to about 60%, or about 10% to about 50%, by weight, of the fibers present in one of the pluralities or types of yarn used in making the textile material.

In one preferred embodiment, the textile material comprises a plurality of yarns comprising a blend of cellulosic fibers and synthetic fibers (e.g., synthetic staple fibers). In this embodiment, the synthetic fibers can be any of those described above, with polyamide fibers (e.g., polyamide staple fibers) being particularly preferred. In such an embodiment, the cellulosic fibers comprise about 30% to about 90% (e.g., about 40% to about 90%, about 50% to about 90%, about 70% to about 90%, or about 75% to about 90%), by weight, of the fibers present in the yarn, and the polyamide fibers comprise about 10% to about 50% (e.g., about 10% to about 40%, about 10% to about 35%, about 10% to about 30%, or about 10% to about 25%), by weight, of the fibers present in the yarn.

In those embodiments in which the textile material comprises thermoplastic synthetic fibers, the thermoplastic synthetic fibers can be present in the textile material in any suitable amount. For example, in certain embodiments, the thermoplastic synthetic fibers can comprise about 1% or more, about 2.5% or more, about 5% or more, about 7.5% or more, or about 10% or more, by weight, of the fibers present in the textile material. The thermoplastic synthetic fibers can comprise about 40% or less, about 35% or less, about 30% or less, about 25% or less, about 20% or less, or about 15% or less, by weight, of the fibers present in the textile material. More specifically, in certain embodiments, the thermoplastic synthetic fibers can comprise about 1% to about 40%, about 2.5% to about 35%, about 5% to about 30% (e.g., about 5% to about 25%, about 5% to about 20%, or about 5% to about 15%), or about 7.5% to about 25% (e.g., about 7.5% to about 20%, or about 7.5% to about 15%), by weight, of the fibers present in the textile material.

As noted above, certain embodiments of the textile material of the invention contain yarns comprising inherent flame resistant fibers. As utilized herein, the term "inherent flame resistant fibers" refers to synthetic fibers which, due to the chemical composition of the material from which they are made, exhibit flame resistance without the need for an additional flame retardant treatment. In such embodiments, the inherent flame resistant fibers can be any suitable inherent flame resistant fibers, such as polyoxadiazole fibers, polysulfonamide fibers, poly(benzimidazole) fibers, poly(phenylenesulfide) fibers, meta-aramid fibers, para-aramid fibers, polypyridobisimidazole fibers, polybenzylthiazole fibers, polybenzyloxazole fibers, melamine-formaldehyde polymer fibers, phenol-formaldehyde polymer fibers, oxidized polyacrylonitrile fibers, polyamide-imide fibers and combinations, mixtures, or blends thereof. In certain embodiments, the inherent flame resistant fibers are preferably selected from the group consisting of polyoxadiazole fibers, polysulfonamide fibers, poly(benzimidazole) fibers, poly(phenylenesulfide) fibers, meta-aramid fibers, para-aramid fibers, and combinations, mixtures, or blends thereof.

The inherent flame resistant fibers can be present in one of the pluralities or types of yarn used in making the textile material in any suitable amount. For example, in certain embodiments, the inherent flame resistant fibers can comprise about 100%, by weight, of the fibers present in one of the pluralities or types of yarn used in making the textile material. In those embodiments in which the textile material comprises a yarn containing a blend of cellulosic fibers and inherent flame resistant fibers, the inherent flame resistant fibers can comprise about 5% or more, about 10% or more, about 20% or more, about 30% or more, about 40% or more, or about 50% or more, by weight, of the fibers present in the yarn. Thus, in such embodiments, the inherent flame resistant fibers can comprise about 5% to about 95% or about 10% to about 65%, by weight, of the fibers present in the yarn. More preferably, in such an embodiment, the inherent flame resistant fibers can comprise about 20% to about 50%, by weight, of the fibers present in the yarn.

The inherent flame resistant fibers can be present in the textile material in any suitable amount. Generally, the amount of inherent flame resistant fibers included in the textile material will depend upon the desired properties of the final textile material. In certain embodiments, the inherent flame resistant fibers can comprise about 20% or more, about 25% or more, about 30% or more, about 35% or more, about 40% or more, or about 45% or more, by weight, of the fibers present in the textile material. In certain embodiments, the inherent flame resistant fibers can comprise about 75% or less, about 70% or less, about 65% or less, about 60% or less, about 55% or less, about 50% or less, about 45% or less, or about 40% or less, by weight, of the fibers present in the textile material. Thus, in certain embodiments, the inherent flame resistant fibers can comprise about 20% to about 70%, about 25% to about 75% (e.g., about 25% to about 60%, about 25% to about 50%, about 25% to about 45%, or about 25% to about 40%), about 30% to about 70%, about 35% to about 65%, about 40% to about 60%, or about 45% to about 55%, by weight, of the fibers present in the textile material.

The article of the invention preferably exhibits relatively low levels of extractable formaldehyde. For example, the article of the invention preferably exhibits an extractable formaldehyde content of about 90 ppm or less. The article of the invention more preferably exhibits an extractable formaldehyde content of about 85 ppm or less, about 80 ppm or less, about 75 ppm or less, about 70 ppm or less, about 65 ppm or less, about 60 ppm or less, about 55 ppm or less, about 50 ppm or less, about 45 ppm or less, about 40 ppm or less, about 35 ppm or less, about 30 ppm or less, about 25 ppm or less, or about 20 ppm or less. The extractable formaldehyde content can be measured by any suitable method, but preferably is measured by International Standard ISO 14184-1 entitled "Textiles-Determination of formaldehyde."

The article of the invention can be made by any suitable process. For example, the article can be made by a process comprising the steps of: (a) providing a textile material having at least one surface; (b) providing at least one condensed phosphorus compound; (c) applying the condensed phosphorus compound to at least a portion of the surface of the textile material; (d) heating the textile material to cause the condensed phosphorus compound to react and form a first intermediate polymer on the textile material; (d) exposing the textile material to a Brønsted base under conditions sufficient to convert at least a portion of the phosphonium moieties in the intermediate polymer to phosphine moieties thereby producing a second intermediate polymer; (e) oxidizing the second intermediate polymer on the surface of the textile material by exposing the textile material to a suitable oxidizing agent under conditions sufficient to oxidize at least a portion of the phosphorus atoms in the polymer to a pentavalent state thereby producing a phosphorus-containing polymer on the surface of the textile material; and (f) exposing the textile material to a Brønsted base to neutralize at least a portion of acid generated by the preceding oxidation step. Preferably, the condensed phosphorus compound is one of the condensed phosphorus compounds described above in connection with the composition embodiment of the invention.

The process for producing the article is very similar to the process for producing the phosphorus-containing polymer described above, with the polymer being produced on a textile material as opposed to some other medium. Accordingly, the treatment composition, condensed phosphorus compound, Brønsted base, oxidizing agent, and reaction conditions described above can be used in this process embodiment of the invention. Furthermore, any of the textile materials described above in connection with the article embodiment can be used in this process.

The condensed phosphorus compound can be applied to the textile material in any suitable manner. For example, the condensed phosphorus compound can be contained in a composition according to the first embodiment of the invention. In such an embodiment, the composition, which as noted above preferably takes the form of a low viscosity aqueous solution or dispersion, can be padded or sprayed onto the textile material using standard textile processing equipment. Any suitable amount of the composition can be applied to the textile material. Preferably, the amount of the composition applied to the textile material is an amount sufficient to provide, after curing to form the polymer, an amount of elemental phosphorus on the textile material falling within one of the ranges recited above.

If desired, the textile material can be treated with one or more softening agents (also known as "softeners") to improve the hand of the treated textile material. The softening agent selected for this purpose should not have a deleterious effect on the flammability of the resultant fabric. Suitable softeners include polyolefins, alkoxylated alcohols (e.g., ethoxylated alcohols), alkoxylated ester oils (e.g., ethoxylated ester oils), alkoxylated fatty amines (e.g., ethoxylated tallow amine), alkyl glycerides, alkylamines, quaternary alkylamines, halogenated waxes, halogenated esters, silicone compounds, and mixtures thereof. In a preferred embodiment, the softener is selected from the group consisting of cationic softeners and nonionic softeners.

The softener can be present in the textile material in any suitable amount. One suitable means for expressing the amount of treatment composition that is applied to the textile material is specifying the amount of softener that is applied to the textile material as a percentage of the weight of the untreated textile material (i.e., the textile material prior to the application of the treatment composition described herein). This percentage can be calculated by taking the weight of softener solids applied, dividing this value by the weight of the untreated textile material, and multiplying by 100%. Preferably, the softener is present in the textile material in an amount of about 0.1% or more, about 0.2% or more, or about 0.3% or more, by weight, based on the weight of the untreated textile material. Preferably, the softener is present in the textile material in an amount of about 10% or less, about 9% or less, about 8% or less, about 7% or less, about 6% or less, or about 5% or less, by weight, based on the weight of the untreated textile material. Thus, in certain preferred embodiments, the softener is present in the textile material in an amount of about 0.1% to about 10%, about 0.2% to about 9% (e.g., about 0.2% to about 8%, about 0.2% to about 7%, about 0.2% to about 6%, or about 0.2% to about 5%), or about 0.3% to about 8% (e.g., about 0.3% to about 7%, about 0.3% to about 6%, or about 0.3% to about 5%), by weight, based on the weight of the untreated textile material.

The softener can be applied to the textile material at any suitable time. For example, the softener can be added to the treatment composition described above (i.e., the treatment composition comprising the precondensate compound and the cross-linking composition) so that the softener is applied to the textile material at the same time as the phosphorus-containing polymer. The softener can also be applied to the textile material following treatment of the textile material with the treatment composition described above. In this instance, the softener typically would be applied after the textile material has been treated, dried, cured, oxidized, and, if desired, rinsed as described above. In a preferred embodiment of the method described herein, the softener is applied to the textile material in two separate applications. The first application is incorporated into the treatment composition (i.e., the treatment composition comprising the phosphonium compound and the cross-linking composition), and the second application is applied to the dry, treated textile material following the steps of treatment, drying, curing, oxidation, rinsing, and drying as described above. In this embodiment, the softener is divided among the two applications so that the final amount of softener applied to the treated textile material falls within one of the ranges described above.

To further enhance the textile material's hand, the textile material can optionally be treated using one or more mechanical surface treatments. A mechanical surface treatment typically relaxes stress imparted to the fabric during curing and fabric handling, breaks up yarn bundles stiffened during curing, and increases the tear strength of the treated fabric. Examples of suitable mechanical surface treatments include treatment with high-pressure streams of air or water (such as those described in U.S. Pat. No. 4,918,795, U.S. Pat. No. 5,033,143, and U.S. Pat. No. 6,546,605), treatment with steam jets, needling, particle bombardment, ice-blasting, tumbling, stone-washing, constricting through a jet orifice, and treatment with mechanical vibration, sharp bending, shear, or compression. A sanforizing process may be used instead of, or in addition to, one or more of the above processes to improve the fabric's hand and to control the fabric's shrinkage. Additional mechanical treatments that may be used to impart softness to the treated fabric, and which may also be followed by a sanforizing process, include napping, napping with diamond-coated napping wire, gritless sanding, patterned sanding against an embossed surface, shot-peening, sand-blasting, brushing, impregnated brush rolls, ultrasonic agitation, sueding, engraved or patterned roll abrasion, and impacting against or with another material, such as the same or a different fabric, abrasive substrates, steel wool, diamond grit rolls, tungsten carbide rolls, etched or scarred rolls, or sandpaper rolls.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

What is claimed is:

1. A composition comprising at least one condensed phosphorus compound, the condensed phosphorus compound being produced by reacting together in a condensation reaction
   (a) a nitrogen compound conforming to the structure of Formula (N)

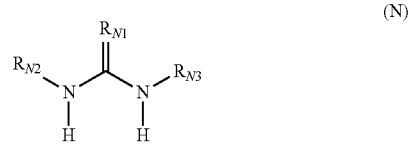

wherein $R_{N1}$ is selected from the group consisting of an oxygen atom, a sulfur atom, and a N—H group, and $R_{N2}$ and $R_{N3}$ are independently selected from the group consisting of hydrogen, hydrocarbyl groups, substituted hydrocarbyl groups, acyl groups, and silyl groups; and
   (b) a phosphonium compound conforming to the structure of Formula (P)

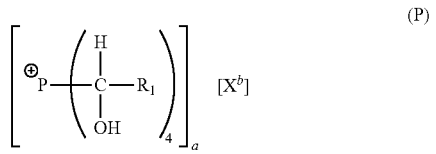

wherein the variable a is a positive integer; each $R_1$ is selected from the group consisting of hydrogen, $C_1$-$C_3$ alkyl groups, $C_1$-$C_3$ haloalkyl groups, $C_2$-$C_3$ alkenyl groups, and $C_2$-$C_3$ haloalkenyl groups; X is an anion selected from the group consisting of halides, sulfate, hydrogen sulfate, phosphate, acetate, carbonate, bicarbonate, borate, and hydroxide; b is a negative integer representing the charge of the anion X; and a is equal to (−b);
   wherein the nitrogen compound and the phosphonium compound are reacted together in a ratio of 1 to 3 molar equivalents of nitrogen compound to 1 molar equivalent of phosphonium cations; and wherein about 30 mol. % or less of the condensed phosphorus compounds contained in the composition comprise moieties conforming to the structure of Formula (B)

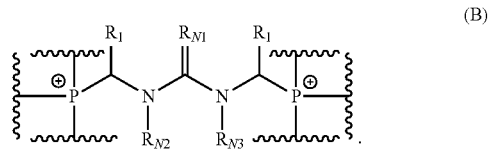

2. The composition of claim 1, wherein about 20 mol. % or less of the condensed phosphorus compounds contained in the composition comprise moieties conforming to the structure of Formula (B).

3. The composition claim 1, wherein about 50 mol. % or more of the phosphorus atoms present in condensed phosphorus compounds in the composition are present in condensed phosphorus compounds conforming to the structure of Formula (M)

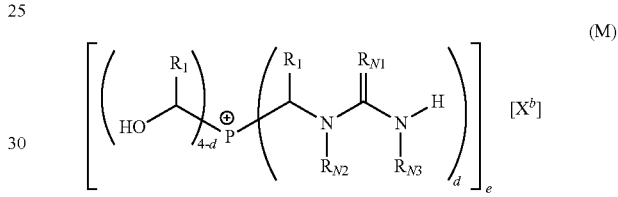

wherein d in an integer from 1 to 3, and e is a positive integer equal to (−b).

4. The composition of claim 3, wherein about 60 mol. % or more of the phosphorus atoms present in condensed phosphorus compounds in the composition are present in condensed phosphorus compounds conforming to the structure of Formula (M).

5. The composition of claim 1, wherein about 5 mol. % or less of the phosphorus atoms present in condensed phosphorus compounds in the composition are present in condensed phosphorus compounds conforming to the structure of Formula (T)

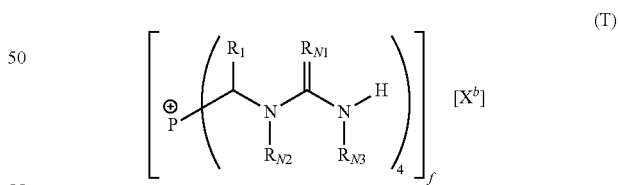

wherein f is a positive integer equal to (−b).

6. The composition of claim 5, wherein about 1 mol. % or less of the phosphorus atoms present in condensed phosphorus compounds in the composition are present in condensed phosphorus compounds conforming to the structure of Formula (T).

7. The composition of claim 1, wherein the nitrogen compound and the phosphonium compound are reacted together in a ratio of 1 to about 2 molar equivalents of the nitrogen compound to 1 molar equivalent of the phosphonium cations.

8. The composition of claim 1, wherein about 40 mol. % or less of the phosphorus atoms present in the composition are contained in unreacted phosphonium compounds conforming to the structure of Formula (P).

9. The composition of claim 1, wherein about 30 mol. % or less of the phosphorus atoms present in the composition are contained in unreacted phosphonium compounds conforming to the structure of Formula (P).

10. The composition of claim 1, wherein the composition has a viscosity of about 150 cP or less at 20° C.

* * * * *